(12) United States Patent
Lin

(10) Patent No.: US 8,261,412 B1
(45) Date of Patent: Sep. 11, 2012

(54) HINGE ASSEMBLY AND FOLDABLE ELECTRONIC DEVICE USING THE SAME

(75) Inventor: Chao-Chi Lin, Taichung (TW)

(73) Assignee: Leohab Enterprise Co., Ltd., Taichung (TW)

(*) Notice: Subject to any disclaimer, the term of this patent is extended or adjusted under 35 U.S.C. 154(b) by 0 days.

(21) Appl. No.: 13/094,892

(22) Filed: Apr. 27, 2011

(51) Int. Cl.
*E05D 11/08* (2006.01)
(52) U.S. Cl. ............................ 16/340; 16/330; 16/374
(58) Field of Classification Search ............ 16/337–339, 16/342, 330, 303, 374, 376, 377, 340, 355, 16/239, 357, 360, 361, 362, 367; 361/679.06, 361/679.07, 679.08, 679.12, 679.27; 455/90.3, 455/575.1, 575.3, 575.8; 379/433.12, 433.13; 348/373, 333.01, 333.06, 794
See application file for complete search history.

(56) References Cited

U.S. PATENT DOCUMENTS

| | | | | |
|---|---|---|---|---|
| 5,109,570 A * | 5/1992 | Okada et al. | | 16/289 |
| 5,269,047 A * | 12/1993 | Lu | | 16/340 |
| 5,913,351 A * | 6/1999 | Miura | | 16/340 |
| 6,125,507 A * | 10/2000 | Katoh | | 16/329 |
| 6,539,582 B1 * | 4/2003 | Chae | | 16/340 |
| 6,568,034 B2 * | 5/2003 | Cho | | 16/337 |
| 6,618,903 B2 * | 9/2003 | Kim | | 16/337 |
| 6,862,779 B1 * | 3/2005 | Lu et al. | | 16/340 |
| 7,082,642 B2 * | 8/2006 | Su | | 16/340 |
| 7,603,747 B2 * | 10/2009 | Ho et al. | | 16/330 |
| 2004/0093690 A1 * | 5/2004 | Lu et al. | | 16/330 |
| 2007/0136992 A1 * | 6/2007 | Lu et al. | | 16/330 |
| 2007/0169312 A1 * | 7/2007 | Ho et al. | | 16/330 |

* cited by examiner

*Primary Examiner* — Chuck Y. Mah
(74) *Attorney, Agent, or Firm* — Alan Kamrath; Kamrath IP Lawfirm, PA

(57) ABSTRACT

A hinge is operable to a fixed open position where it is prevented from being closed and to a position where it is released from the fixed open position and is capable of being operated to a closed position.

10 Claims, 24 Drawing Sheets

HINGE ASSEMBLY AND FOLDABLE ELECTRONIC DEVICE USING THE SAME

BACKGROUND OF THE INVENTION

1. Field of the Invention

The present invention relates to a hinge, and particularly, to a hinge which is operable to a fixed open position that it is prevented from being closed and to a position that it is released from the fixed open position and is capable of being operated to a closed position.

2. Description of the Related Art

An electronic device includes two bodies which are pivotally connected to each other by hinges is known. Generally, one body is utilized as a display while the other body is utilized as an input. However, conventional hinges can not make the electronic device move to a fixed open position so the first and second bodies are prevented from being closed.

The present invention is, therefore, intended to obviate or at least alleviate the problems encountered in the prior art.

SUMMARY OF THE INVENTION

According to the present invention, a hinge is operable to a fixed open position where it is prevented from being closed and to a position where it is released from the fixed open position and is capable of being operated to a closed position. The hinge is usable in an electronic device which includes first and second bodies. The first and second bodies are pivotally connected to each other by the hinge. The hinge includes a first fixing assembly, a second fixing member, a first biasing device, a first positioning assembly, a second positioning assembly, and a second biasing device. The first fixing assembly includes a pintle and a first fixing member fixedly joined to the pintle. One of the first and second bodies of the electronic device is fixedly connected to the first fixing member. The second fixing member is pivotally joined to the pintle and includes a first position-limiting passage and a position limit defined thereon. The other of the first and second bodies is fixedly connected to the second fixing member. The first biasing device is disposed on the pintle. The first positioning assembly including an urging member, a first cam, and a first cam follower disposed on the pintle and limited between the first biasing device and one side of a wall of the second fixing member. The urging member includes an extension extending over the first cam and selectively disposed in the first position-limiting passage. The first cam includes a locking slot selectively receiving the position limit and a second position-limiting passage receiving a length of the extension. The first cam follower is fixedly joined to the pintle. The first cam and first cam follower are in a first relative position where protrusions on a surface of the first cam are complementarily received in recesses on a surface of the first cam follower and the surfaces abut against each other, and in a second relative position where the protrusions are not received in the recesses and the surfaces are spaced from each other. The extension is disposed in and disengaged from the first position-limiting passage when the first cam and the first cam follower are in the first and second positions, respectively. The position limit is disposed in and disengaged from the locking slot when the first cam and the first cam follower are in the first and second positions, respectively. The second positioning assembly includes a second cam member and a second cam follower disposed on the pintle. The second cam member and the second fixing member are articulated and pivoted together. The second cam follower is fixedly joined to the pintle. The second cam and second cam follower are in a first relative position where protrusions on a surface of the second cam are complementarily received in recesses on a surface of the second cam follower and the surfaces abut against each other, and in a second relative position where the protrusions are not received in the recesses and the surfaces are spaced from each other. The second positioning assembly is limited between the second biasing device and another side of the wall of the second fixing member.

Furthermore, the extension disengages from the first position-limiting passage, and the first cam and the first cam follower are in the second relative position, and the position limit disengages from the locking slot, when the hinge is in a first position and is closed.

Moreover, the hinge is operable to open to a second position from the first position. The hinge is in the fixed open position when it is in the second position. The urging member is pivoted by the second fixing member and the first cam is pivoted by the urging member during the operation of moving the hinge from the first to second positions, with the first position-limiting passage including a distal end abutting against the extension, with the extension urging a terminal end of the second position-limiting passage. The extension is disposed in the first position-limiting passage, and the first cam and the first cam follower are in the first relative position, and the position limit is received in the locking slot, when the hinge is in the second position.

Moreover, the hinge is operable to open to a third position from the second position. The extension disengages from the first position-limiting passage, and the first cam and the first cam follower are in the second relative position, when the hinge is in the third position. The hinge is operable to close rapidly from the third to the first positions, with the urging member adapted to be urged by the position limit during the operation of moving the hinge from third to the first positions.

DETAILED DESCRIPTION OF THE PREFERRED EMBODIMENT

Figure 1:
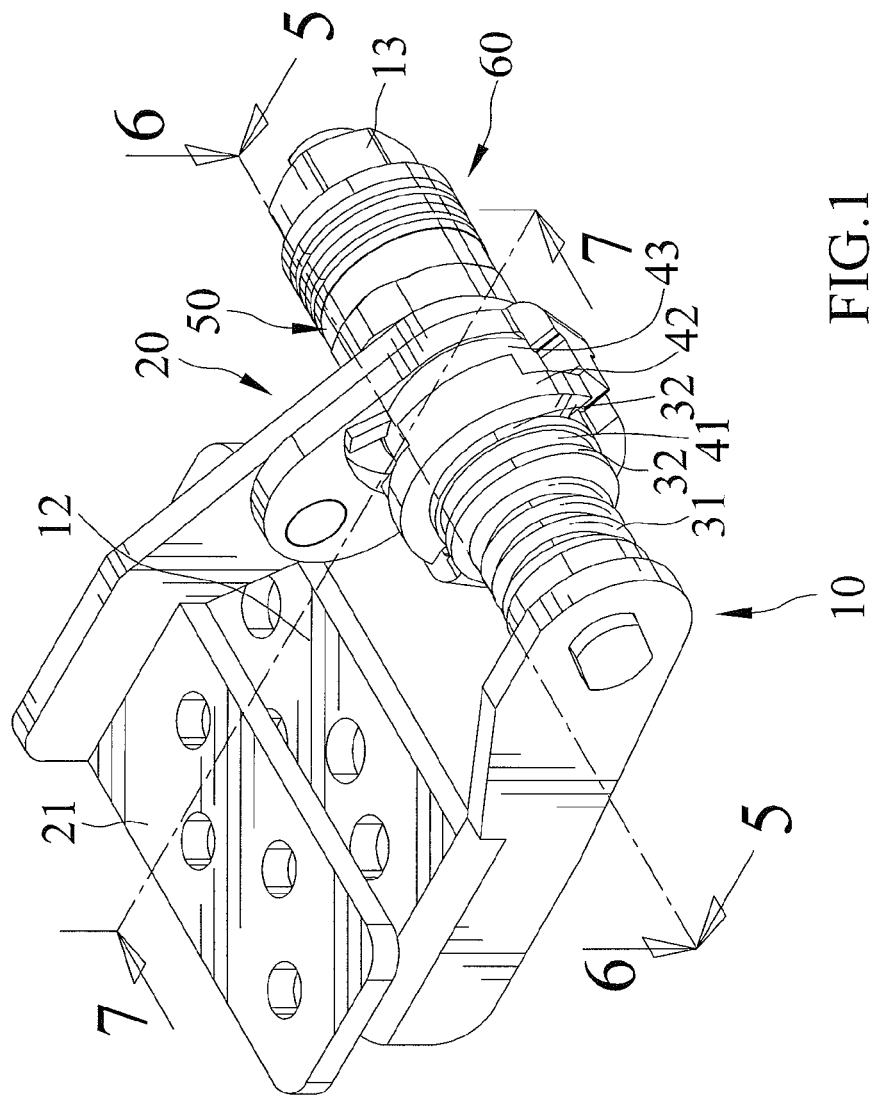
FIG. 1 is a perspective view of a hinge in accordance with the present invention.
Figure 2:
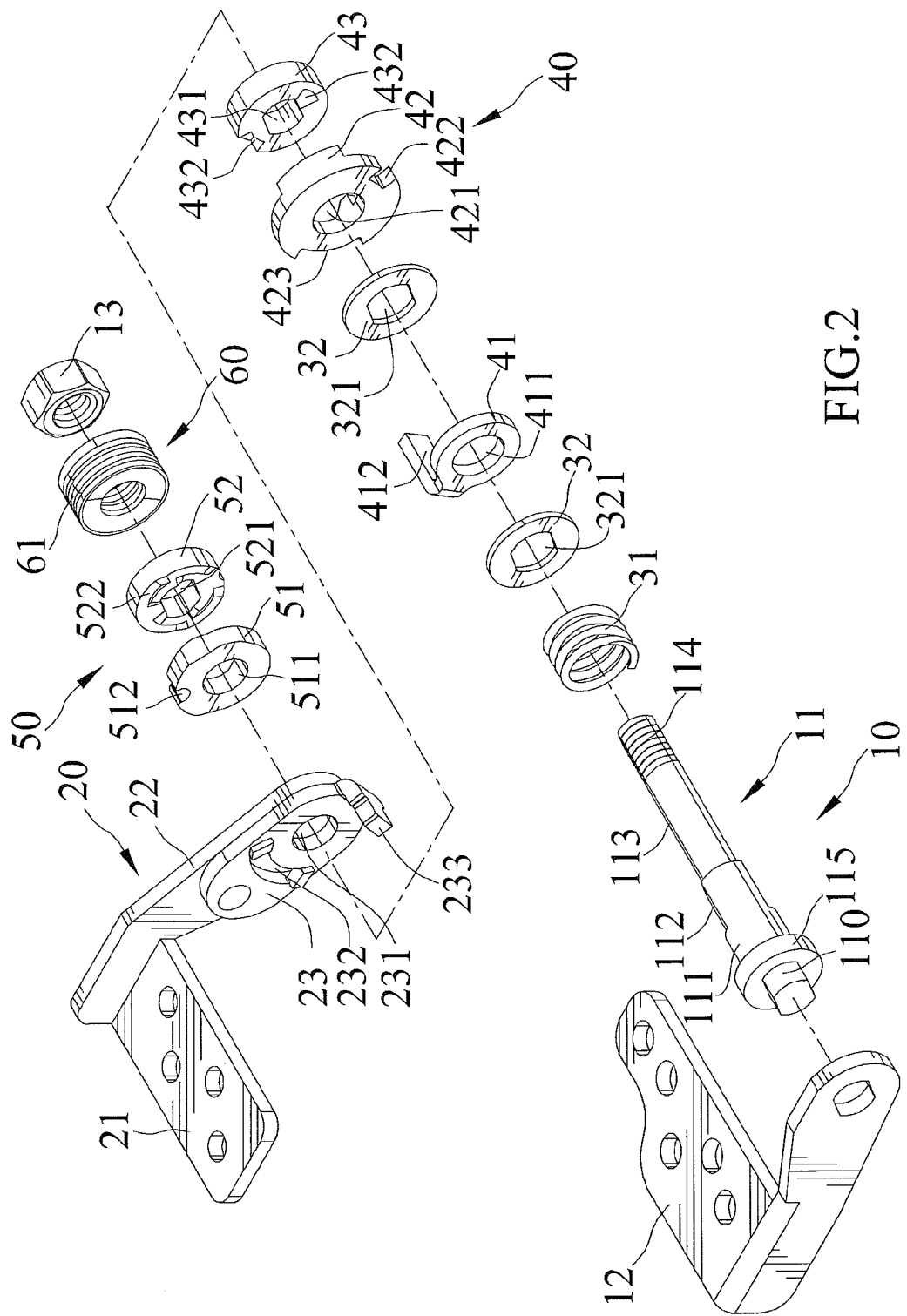
FIG. 2 is an exploded perspective view of the hinge of FIG. 1.
Figure 3:
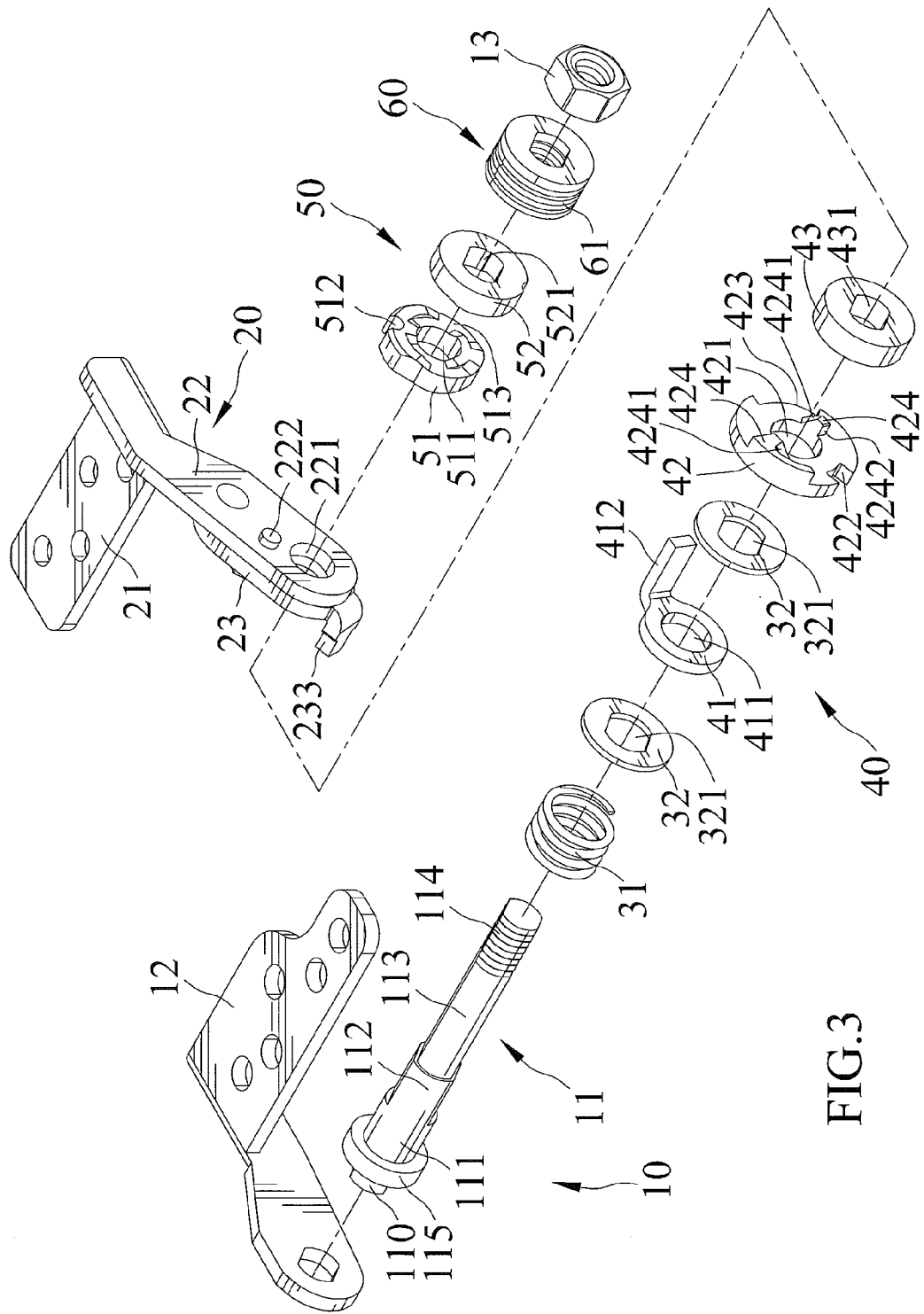
FIG. 3 is another exploded perspective view of the hinge, taken from a view different than that of FIG. 2.
Figure 4:
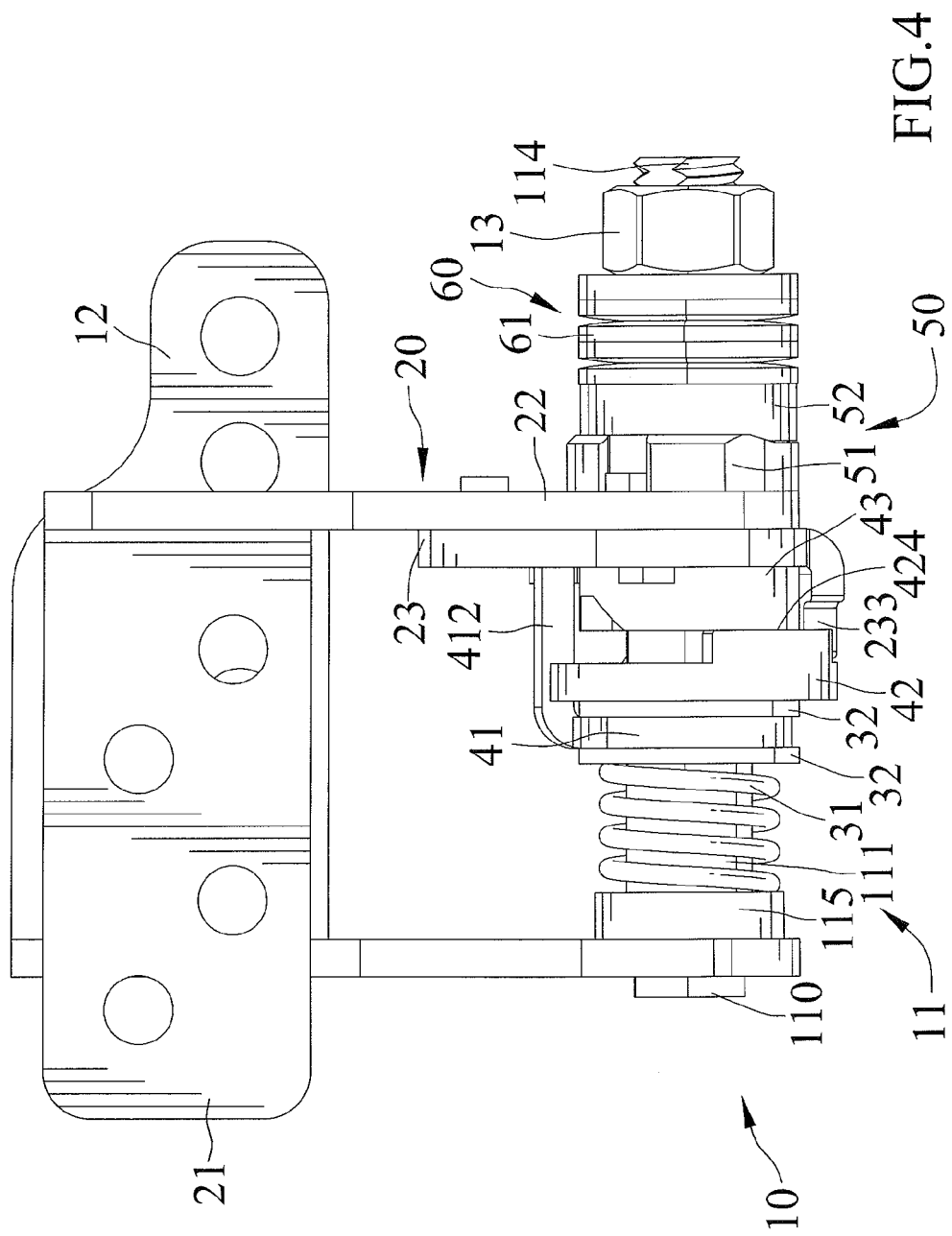
FIG. 4 is a top view of the hinge of FIG. 1.
Figure 5:
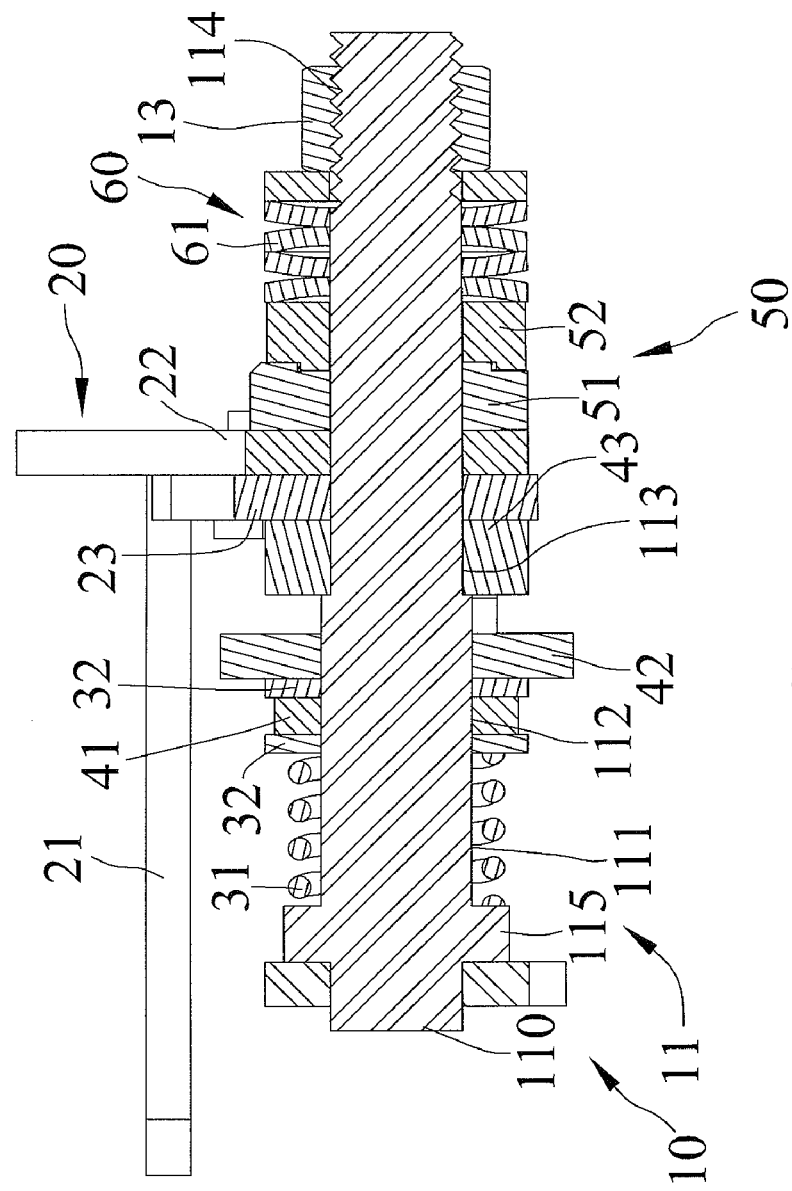
FIG. 5 is a cross-sectional view taken along line 5-5 of FIG. 1.
Figure 6:
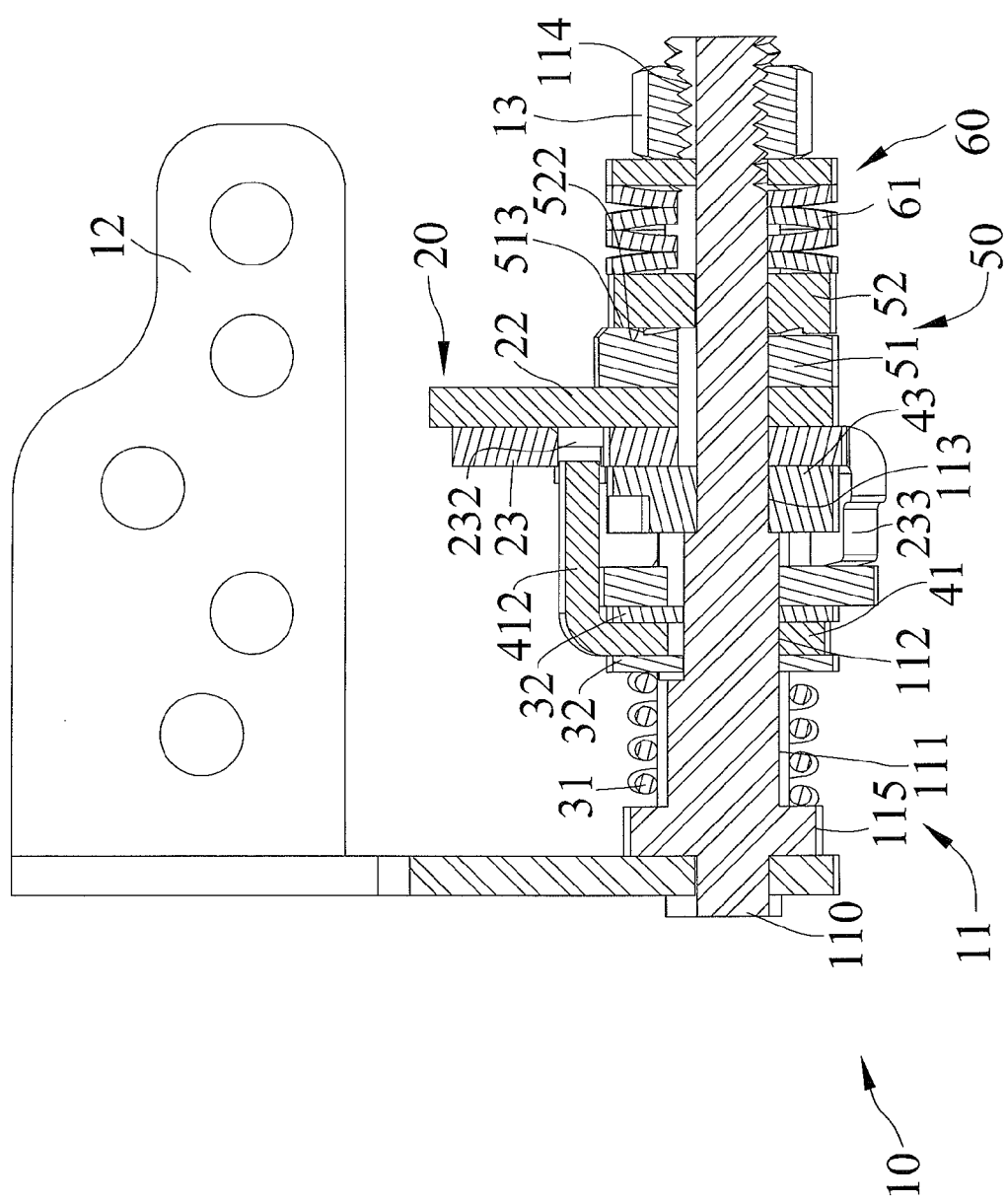
FIG. 6 is a cross-sectional view taken along line 6-6 of FIG. 1.
Figure 7:
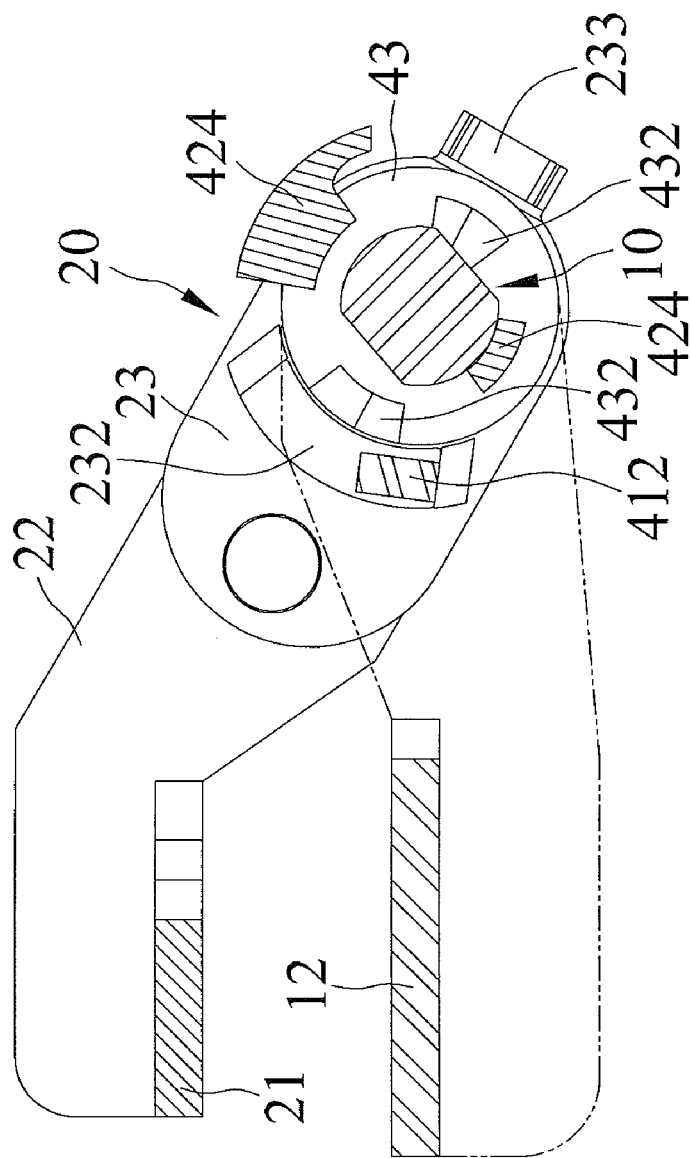
FIG. 7 is a cross-sectional view taken along line 7-7 of FIG. 1.
Figure 8:
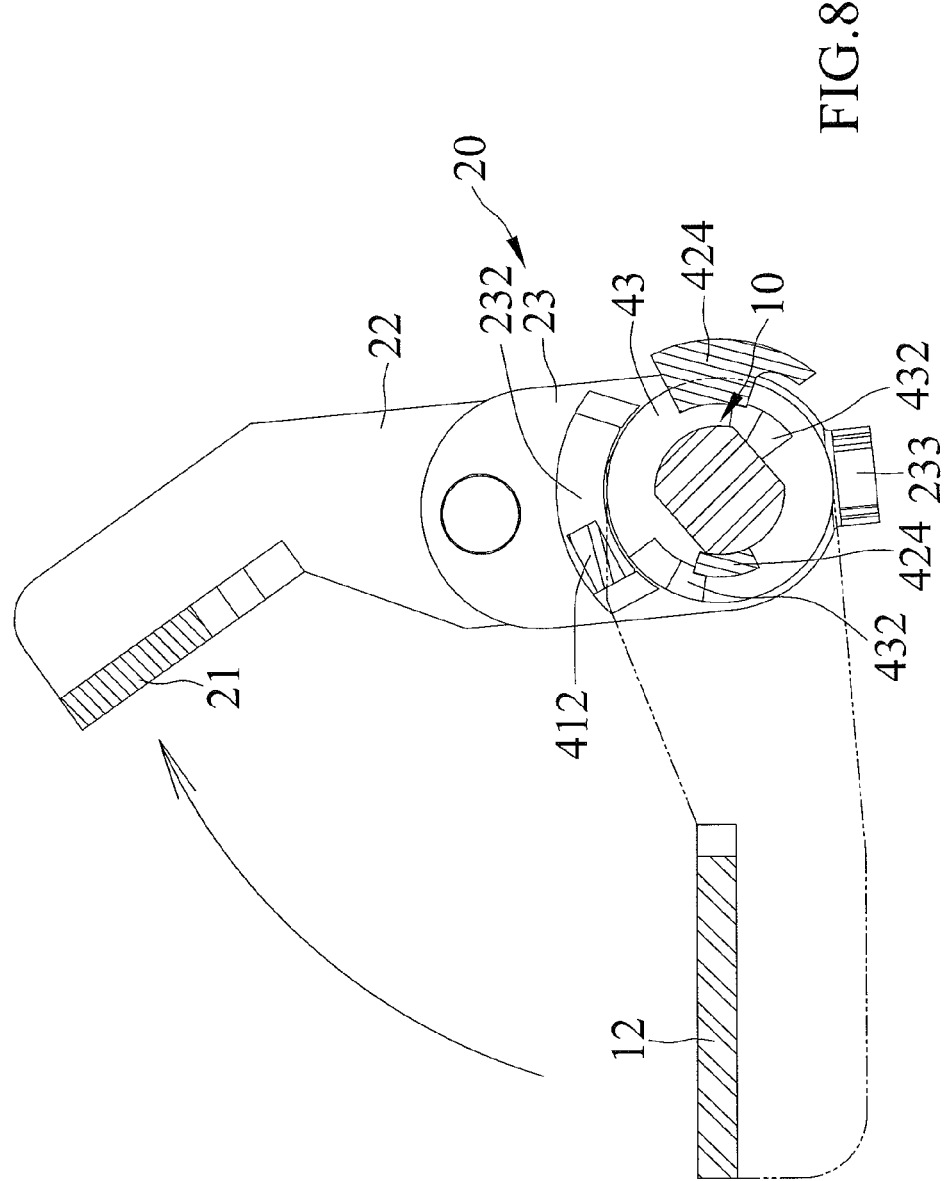
FIG. 8 is a continued cross-sectional view of FIG. 7 showing the operation to open the hinge.
Figure 9:
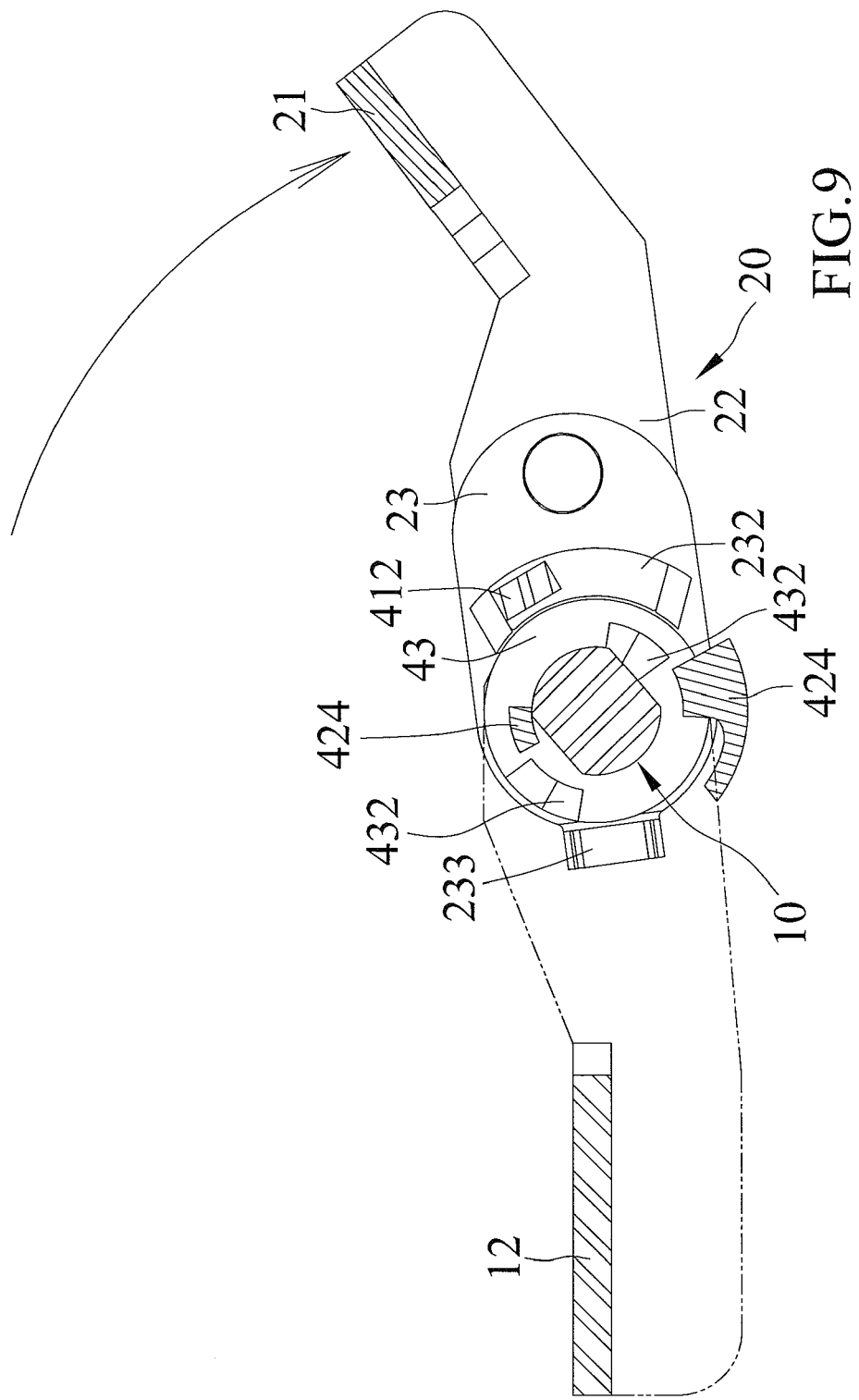
FIG. 9 is a continued cross-sectional view of FIG. 8 showing the hinge in another open position.
Figure 10:
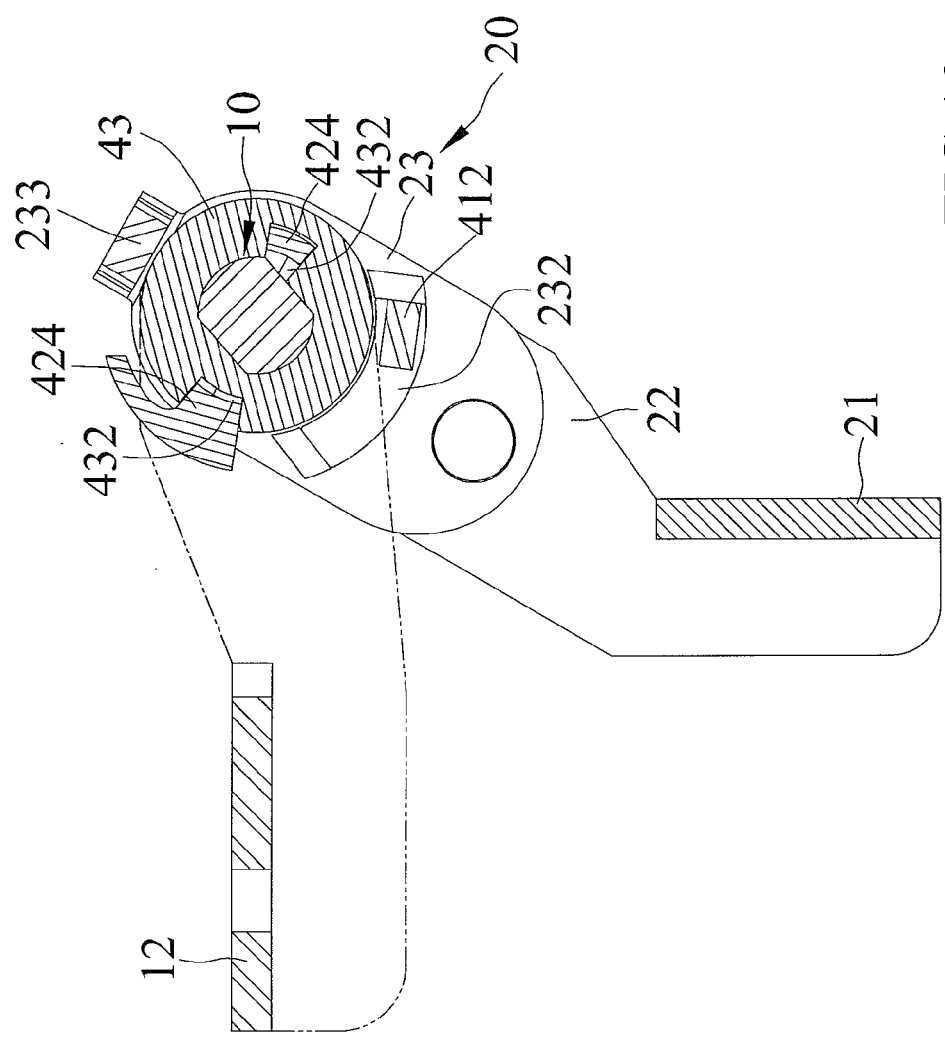
FIG. 10 is a cross-section view of FIG. 9 showing the hinge in a position where a first fixing member thereof is pivoted through 270° from the position shown in FIG. 7 with respect to a second fixing member thereof.
Figure 11:
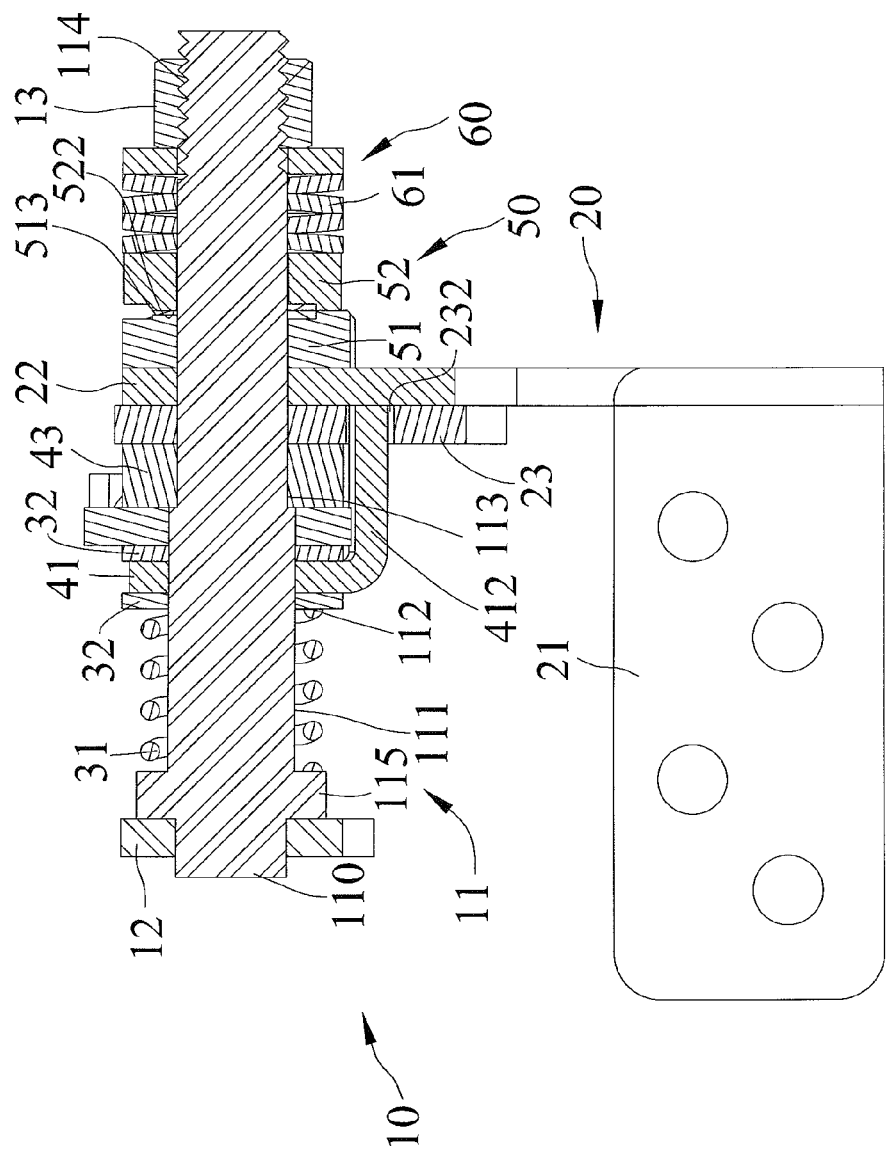
FIG. 11 is another cross-sectional view showing the relative position between the first and second fixing members the same as that in FIG. 10.
Figure 12:
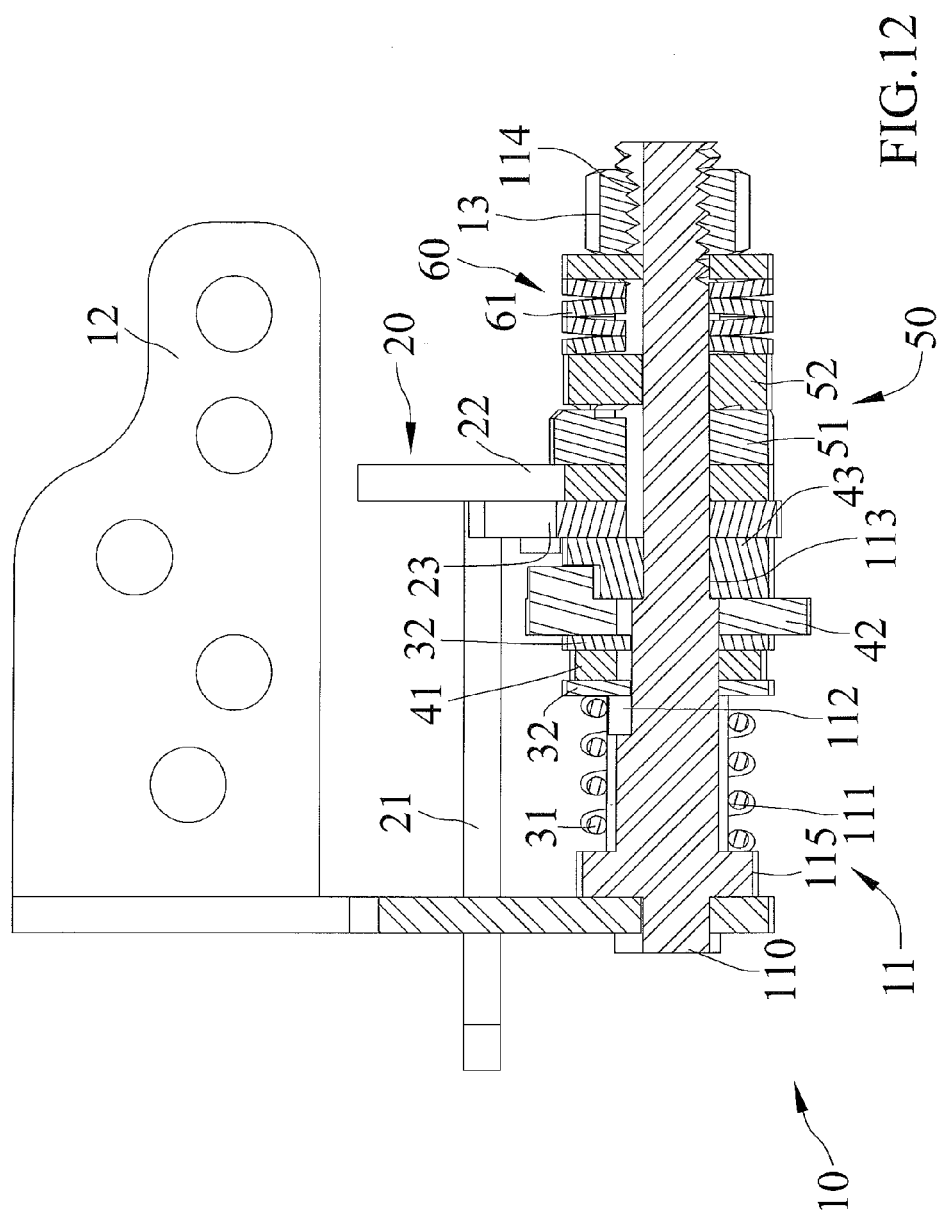
FIG. 12 is yet another cross-sectional view showing the relative position between the first and second fixing members the same as that in FIG. 10.
Figure 13:
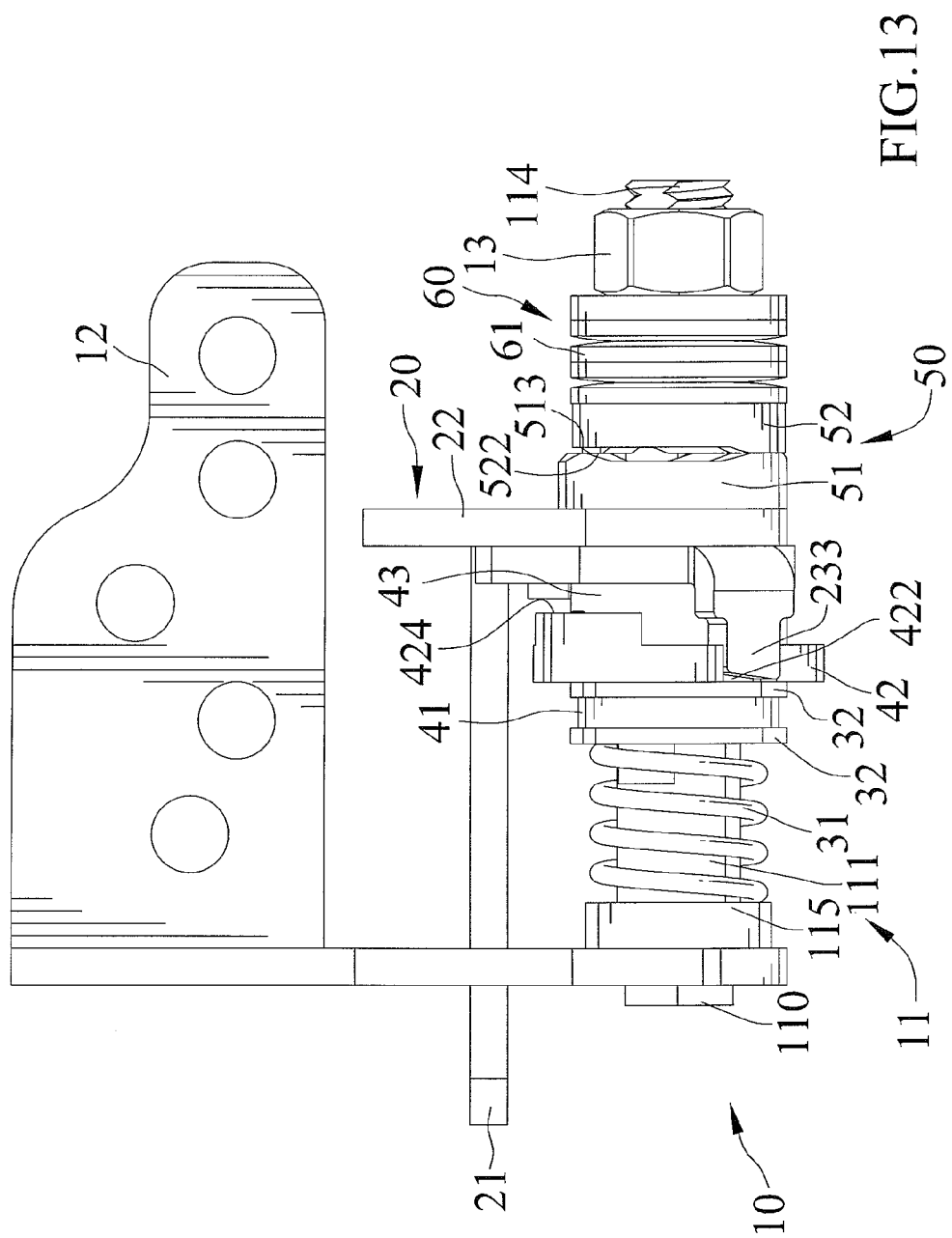
FIG. 13 is a top view the showing the relative position between the first and second fixing members the same as that in FIG. 10.
Figure 14:
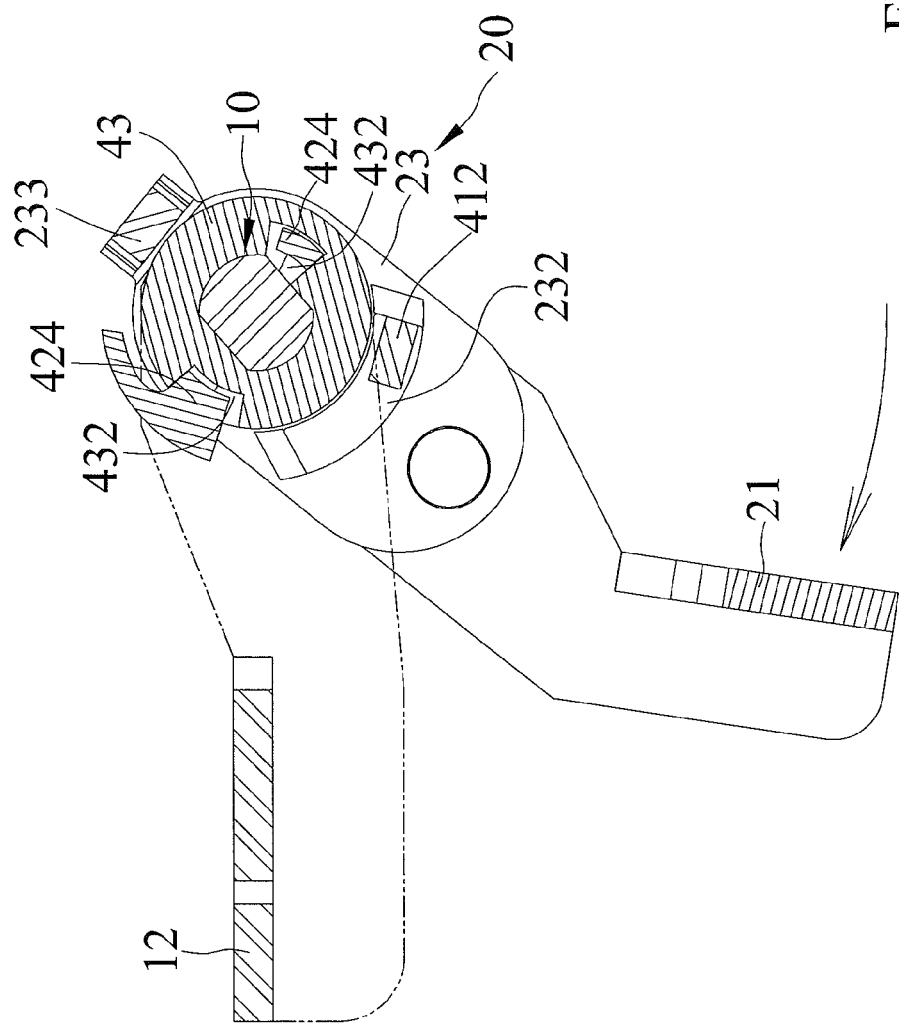
FIG. 14 is a cross-sectional view showing the operation of the hinge to release from a fixed open position.
Figure 15:
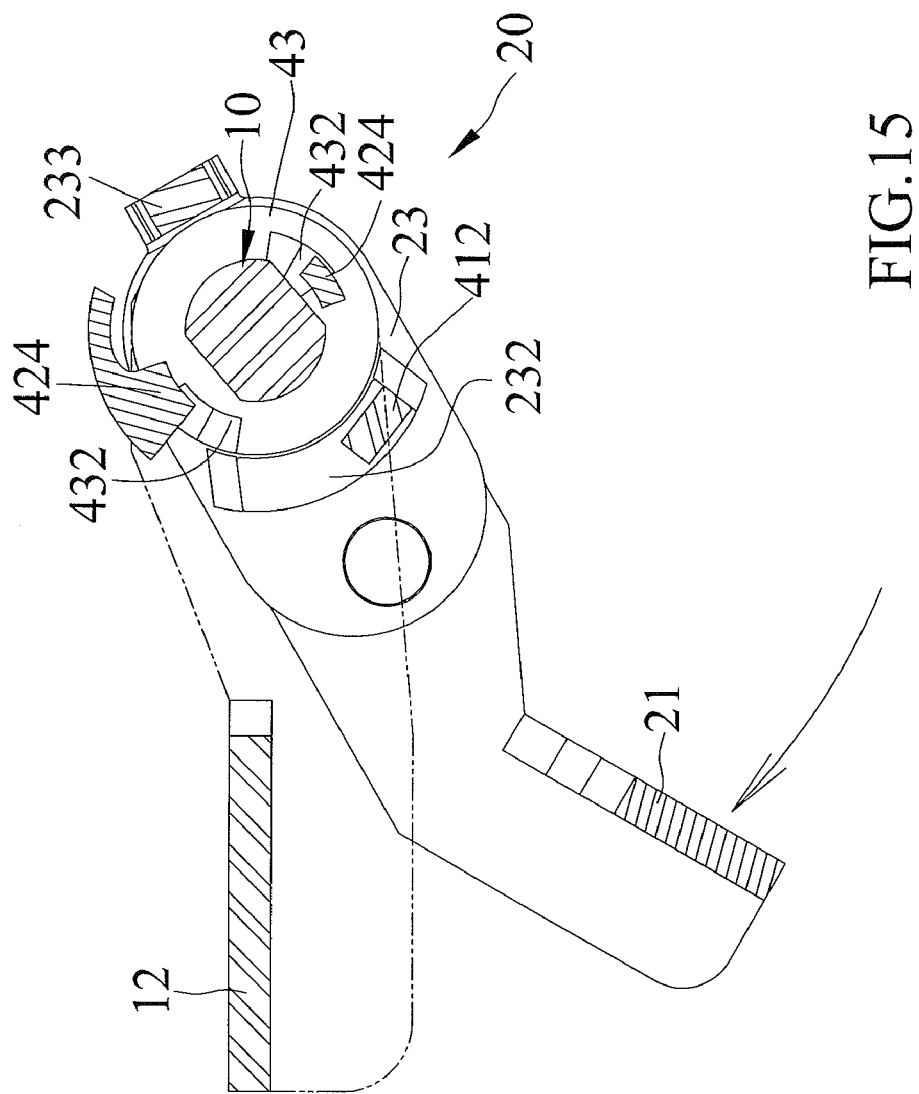
FIG. 15 is a cross-sectional view showing the operation continued from FIG. 14.
Figure 16:
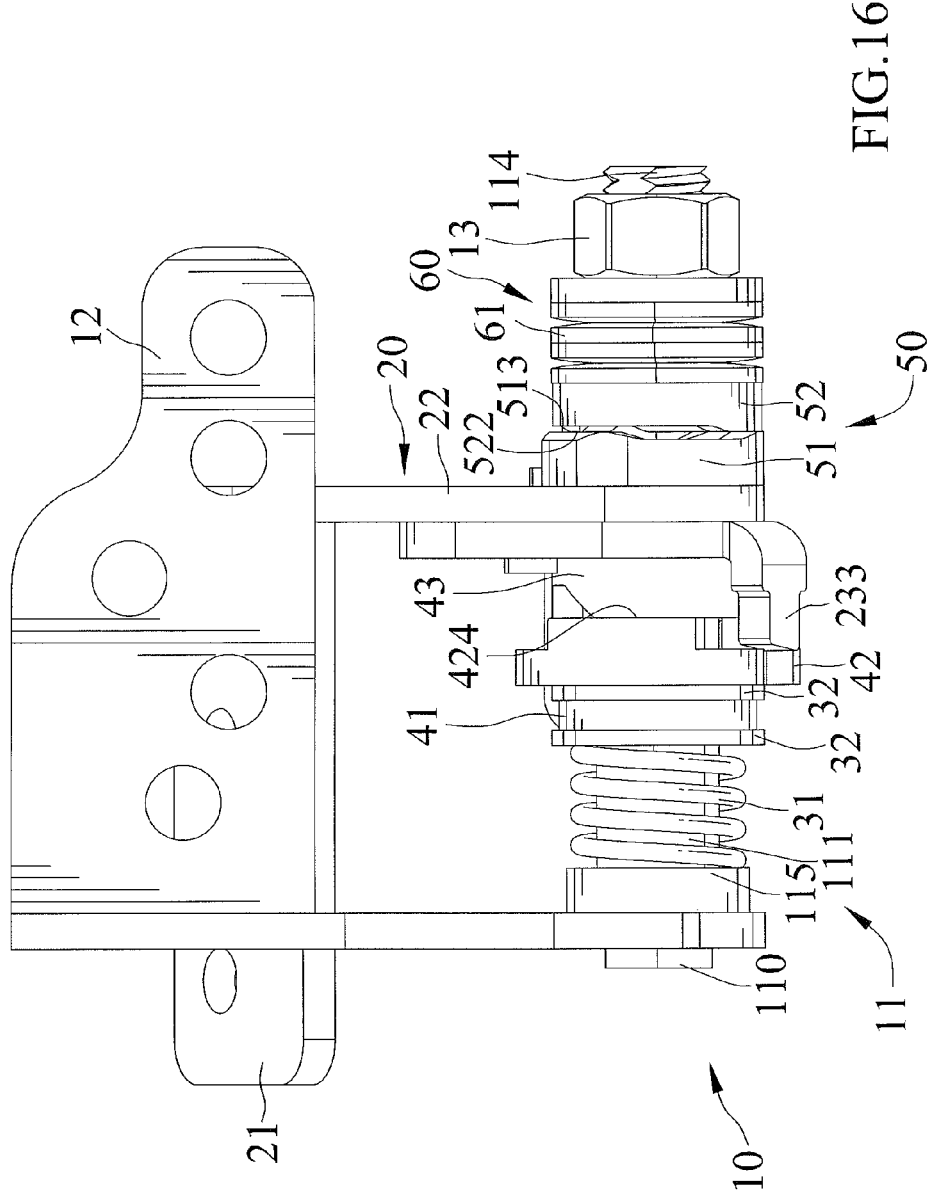
FIG. 16 is a top view showing the hinge in the position shown in FIG. 15.
Figure 17:
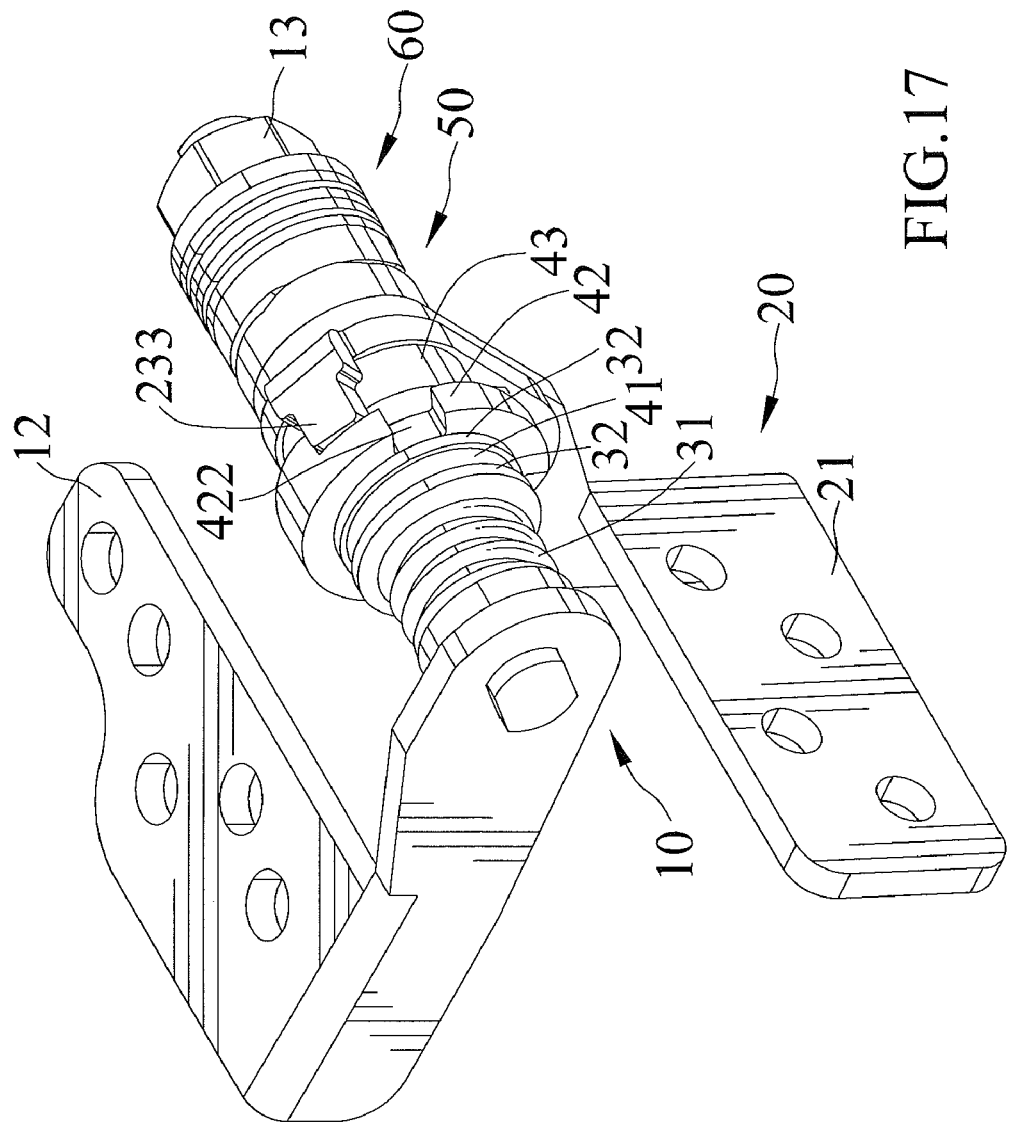
FIG. 17 is a perspective view showing the hinge in a position during the closing operation thereof.
Figure 18:
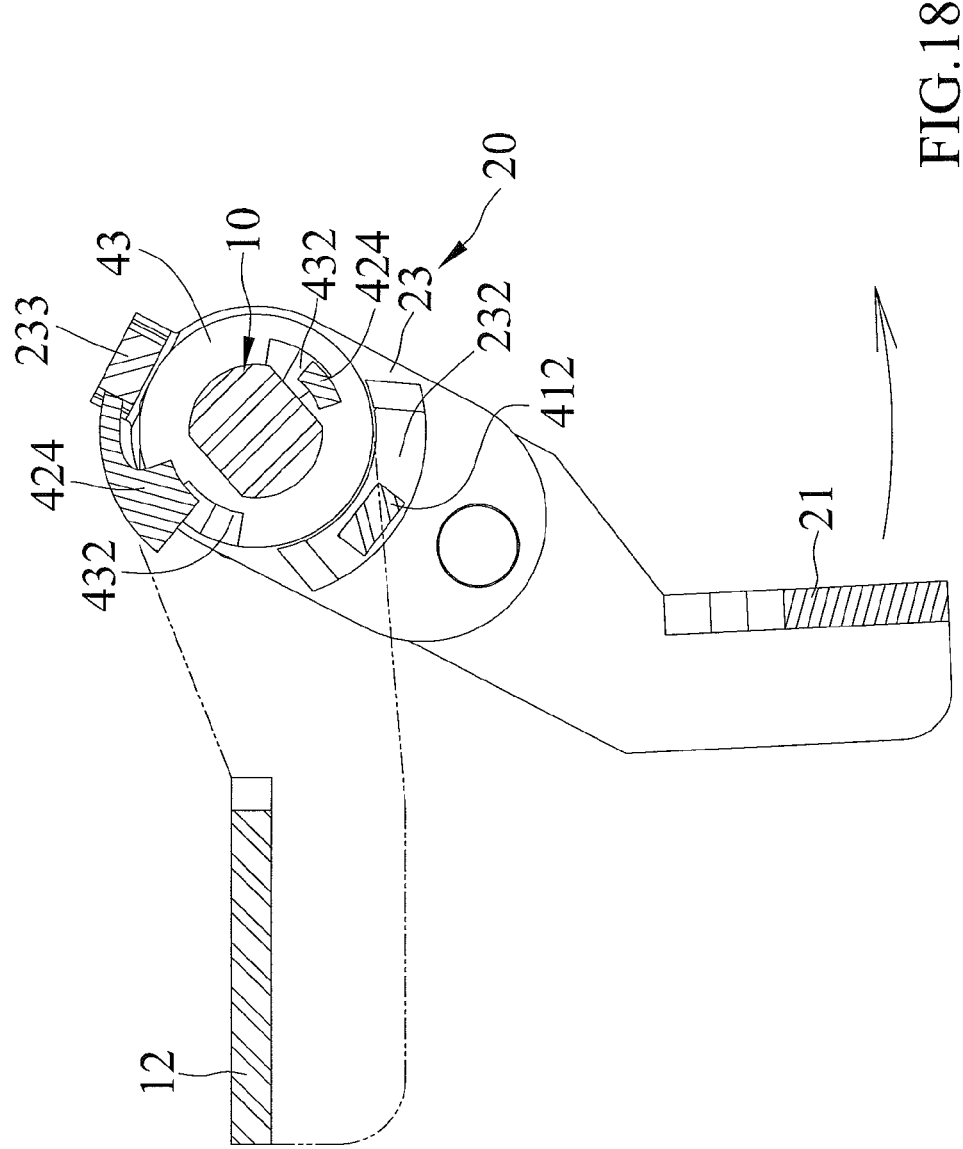
FIG. 18 is a cross-sectional view of FIG. 17.
Figure 19:
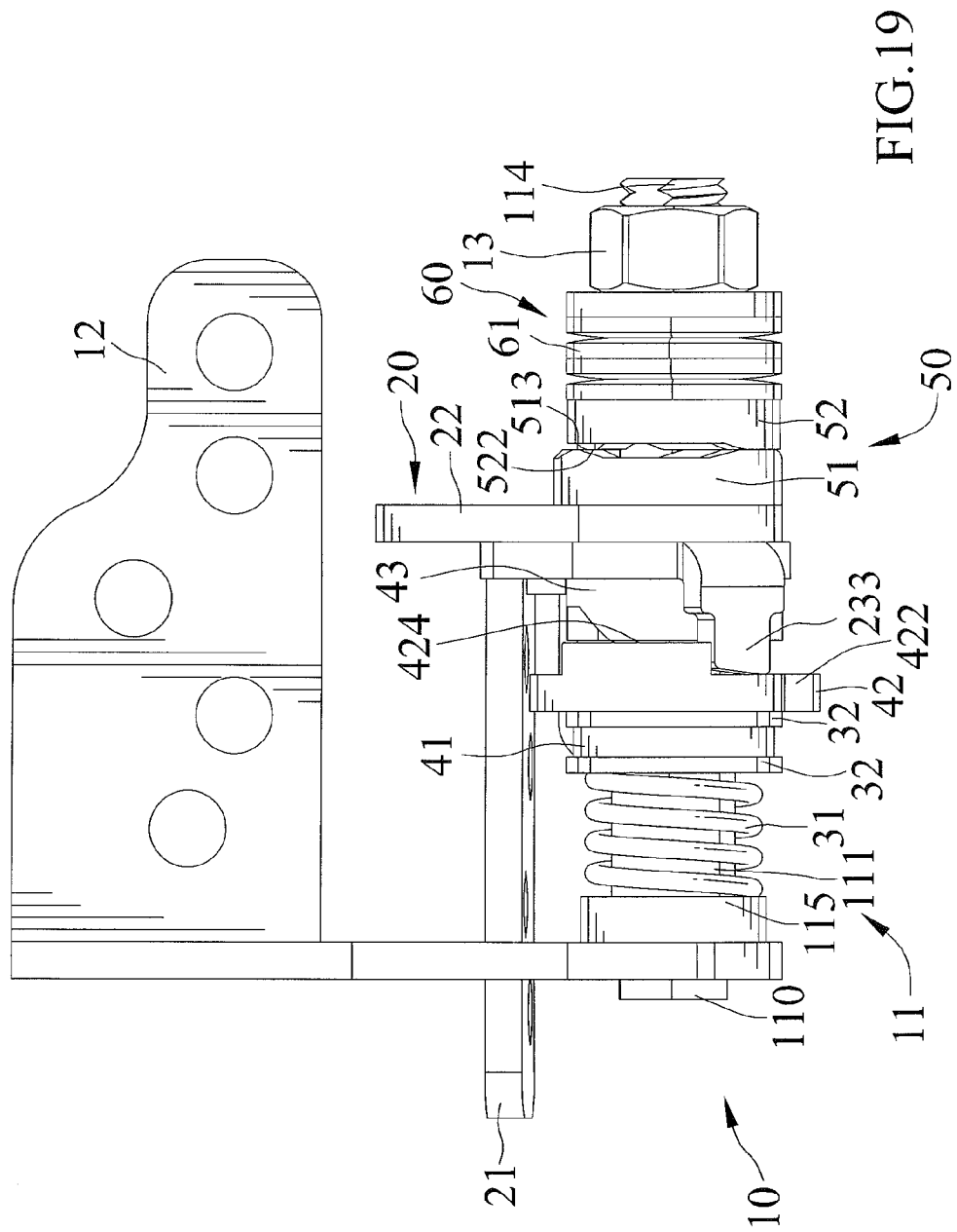
FIG. 19 is a top view of FIG. 17.
Figure 20:
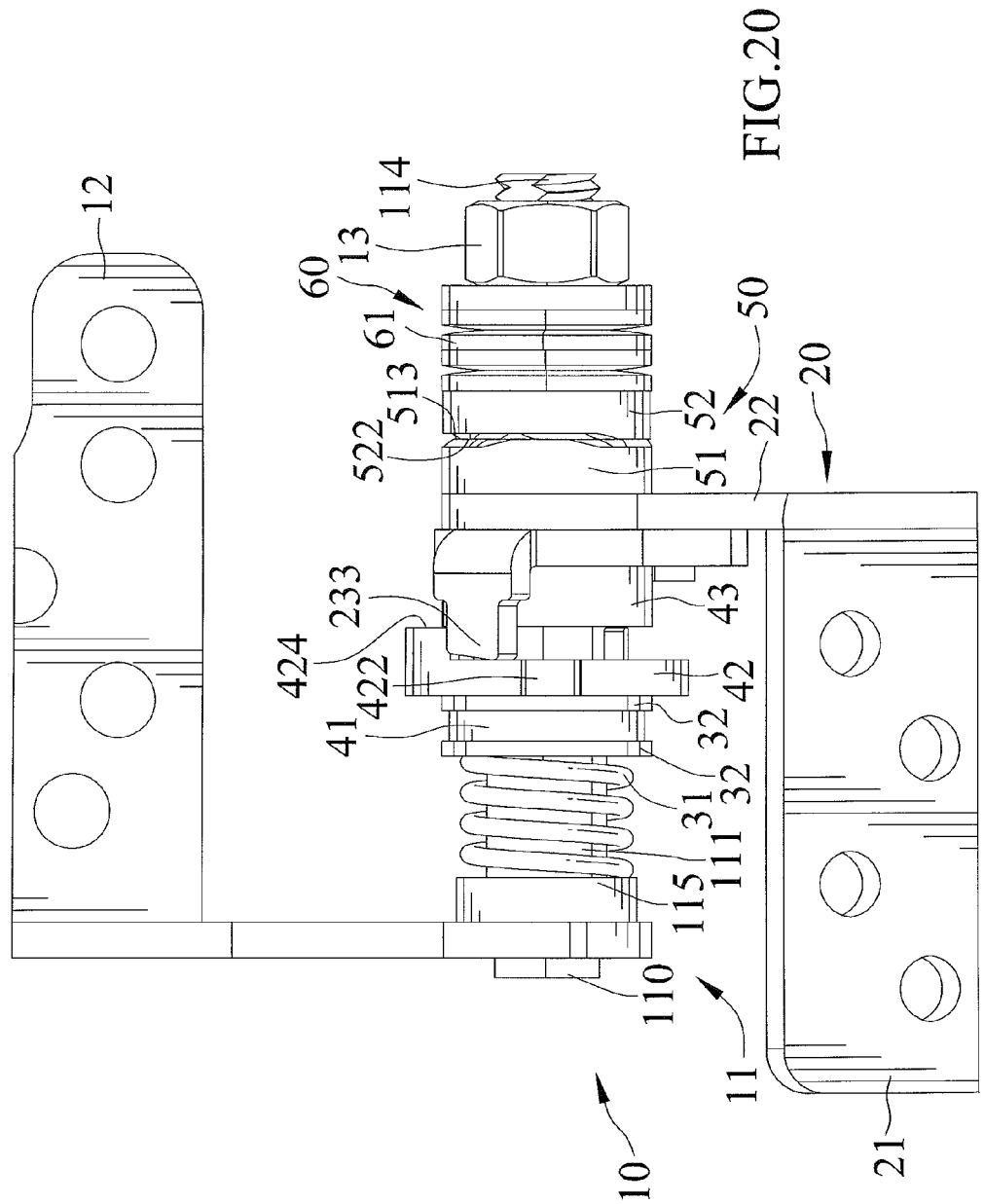
FIG. 20 is a continued top view of FIG. 19 showing the hinge in another position during the closing operation thereof.
Figure 21:
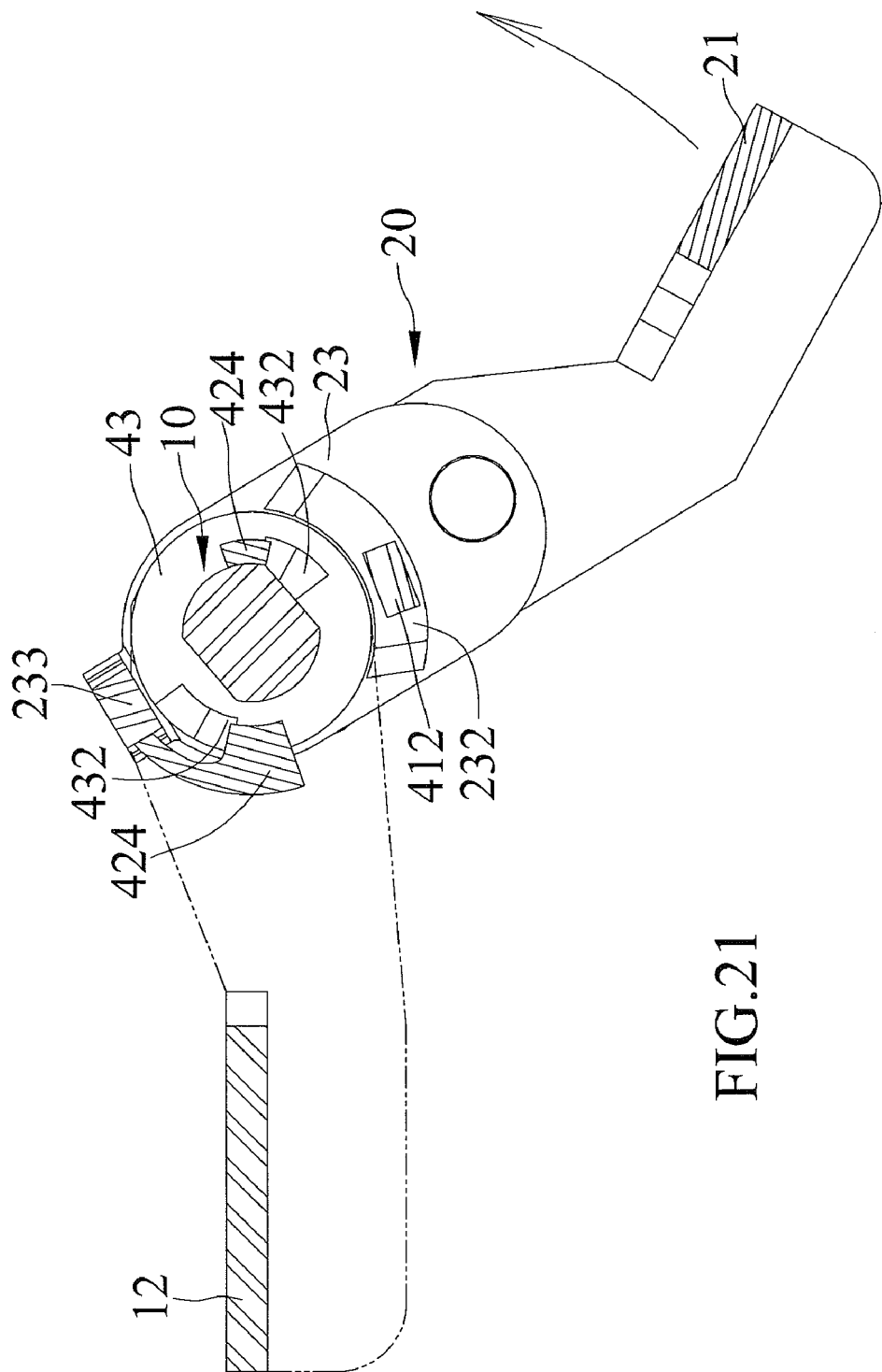
FIG. 21 is a cross-section view of FIG. 20.

FIGS. 1 through 13 show a hinge is operable to a fixed open position where it is prevented from being closed and to a position where it is released from the fixed open position and is capable of being operated to a closed position. The hinge is usable in an electronic device 1 which includes first and second bodies 101 and 102. The first and second bodies 101 and 102 are pivotally connected to each other by the hinge. The hinge includes a first fixing assembly 10, a second fixing member 20, a first biasing device 31, a first positioning assembly 40, a second positioning assembly 50, and a second biasing device 60. The first fixing assembly 10 includes a pintle 11 and a first fixing member 12 fixedly joined to the pintle 11. The pintle 11 includes first, second, third, forth, fifth, and sixth sections 110, 111, 112, 113, 114, and 115. The first, sixth, second, third, forth, and fifth sections 110, 115, 111, 112, 113, and 114 are sequentially disposed. One of the first and second bodies 101 and 102 of the electronic device 1 is fixedly connected to the first fixing member 12. The second fixing member 20 is pivotally joined to the pintle 11. The other of the first and second bodies 101 and 102 is fixedly connected to the second fixing member 20, namely, an engaging end 21. The second fixing member 20 includes a first joining member 22 extending from the engaging end 21 and pivotally receiving the pintle 11 to enable the second fixing member 20 pivotally joined to the pintle 11. A second joining member 23 is fixed to a first of two opposing sides of a wall of the first joining member 22 of the second fixing member 20 and pivotally receives the pintle 11. The second joining member 23 is not in structural contact with the engaging end 21. The first and second joining members 22 and 23 may be integrally formed together. The second fixing member 20 also includes a first hole 221, a linking member 222, a second hole 231, a first position-limiting passage 232, and a position limit 233 defined thereon. The first hole 221 is defined in the first joining member 22 and extends through the two opposing sides. The linking member 222 is defined on the first joining member 22 and extends out from a second of the two opposing sides. The second hole 231 is defined in the second joining member 23 and extends through two opposing sides. The first and second holes 221 and 231 are aligned and communicating with each other. The first position-limiting passage 232 is in the form of a slot and is defined in the second joining member 23 and extends through the two opposing sides. The position limit 233 is defined on the second joining member 23. As a result, the second fixing member 20 is pivotally joined to the pintle 11 by inserting the pintle 11 through the first and second holes 221 and 231 and positioning the first and second joining members 22 and 23 on the fourth section 113. Each of the first and second holes 221 and 231 is of a circular cross section. The fourth section 113 of the pintle 11 is of a non-circular cross section and includes two opposing flat surfaces and two opposing arcuate surfaces. The first biasing device 31 is disposed on second section of the pintle 11. The first biasing device 31 includes a spring which includes a plurality of loops and includes one of two terminal ends abutting against and stopped by the sixth section 115 of the pintle 11. The other of the two terminal ends of the first biasing device 31 abuts against the first position assembly 40. A washer 32 is disposed between the first biasing device 31 and the first position assembly 40. The washer 32 includes an aperture 321 extending therethrough and is fixedly mounted on the pintle 11 by inserting the pintle 11 through the aperture 321. The washer 32 is disposed on the third section 112. Each of the third section 112 and the aperture 321 has a non-circular cross section and includes two flat surfaces and two arcuate surfaces. The first positioning assembly 40 includes an urging member 41, a first cam 42, and a first cam follower 43 disposed on the fourth section 113 of the pintle 11 and limited between the first biasing device 31 and one side of a wall of the second fixing member 20. The second fixing member 20 includes the second joining member 23 abutting against the first positioning assembly 40. The urging member 41 includes an orifice 411 extending therethrough and is pivotally fixed to the pintle 11 by inserting the pintle 11 through the orifice 411. The urging member 41 further includes an extension 412 extending over the first cam 42 and selectively disposed in the first position-limiting passage 232. The first cam 42 includes an orifice 421 extending therethrough and is pivotally fixed to the pintle 11 by inserting the pintle 11 through the orifice 421. The first cam 42 also includes a locking slot 422, a second position-limiting passage 423, and a plurality of protrusions 424 defined thereon. The locking slot 422 is in the form of a slot and is defined in the circumferential surface of the first cam 42 and selectively receives the position limit 233. The second position-limiting passage 423 extends circumferentially in the circumferential surface of the first cam 42 and receives a length of the extension 412. The plurality of protrusions 424 are defined on and extend from a surface of the first cam 42 and each includes a first surface 4241 extending obliquely and outwardly from the surface of the first cam 42 and defined on one of two distal ends, and a second surface 4242 extending outwardly from the surface of the first cam 42 and defined on the other of the two distal ends. The second surface 4242 extends upright, i.e., substantially 90° from the surface of the first cam 42. The first cam follower 43 is fixedly joined to the pintle 11 and includes an aperture 431 extending therethrough. The first cam follower 43 is mounted on the pintle 11 by inserting the pintle 11 through the aperture 431. The first cam follower 43 further includes a surface including a plurality of recesses 432 defined therein. One of the recesses 432 can complementarily receive one of the protrusions 424. The first cam 42 and first cam follower 43 are in a first relative position where the protrusions 424 on the surface of the first cam 42 are complementarily received in the recesses 432 on the surface of the first cam follower 43 and the surfaces abut against each other, and in a second relative position where the protrusions 424 are not received in the recesses 432 and the surfaces are spaced from each other. Additionally, the extension 412 is disposed in and disengaged from the first position-limiting passage 232 when the first cam 42 and the first cam follower 43 are in the first and second positions, respectively, and the position limit 233 is disposed in and disengaged from the locking slot 422 when the first cam 42 and the first cam follower 43 are in the first and second positions, respectively. Further, another washer 32 is fixedly mounted on the pintle 11 and disposed and limited between the urging member 41 and the first cam 42. The second positioning assembly 50 includes second cam member 51 and a second cam follower 52 disposed on the pintle 11. The second cam member 51 and the second fixing member 20 are articulated and pivoted together. The second cam member 51 includes an orifice 511 extending therethrough and is disposed on the pintle 11 by inserting the pintle 11 through the orifice 511. The second cam member 51 further includes an articulating end 512 engaging with the linking member 222 to join to the second fixing member 20, and a surface including a plurality of recesses 513 defined thereon and extending therefrom. The second cam follower 52 is fixedly joined to the pintle 11 and includes an aperture 521 extending therethrough. The second cam follower 52 is mounted on the pintle 11 by inserting the pintle 11 through the aperture 521. The second cam follower 43 further includes a surface including a plurality of recesses 522 defined therein. One of the recesses 522 can complementarily receive one of the protrusions 513. The second cam 51 and second cam follower 52 are in a first relative position where the protrusions 513 on the surface of the second cam 51 are complementarily received in the recesses 522 on the surface of the second cam follower 52 and the surfaces abut against each other, and in a second relative position where the protrusions 513 are not received in the recesses 522 and the surfaces are spaced from each other. Additionally, the second positioning assembly 50 is limited between the second biasing device 60 and the second side of the wall of the second fixing member 20. The biasing device 60 includes a plurality of resilient members 61 abutted against each other and each is in a disc shape.

Figure 22:
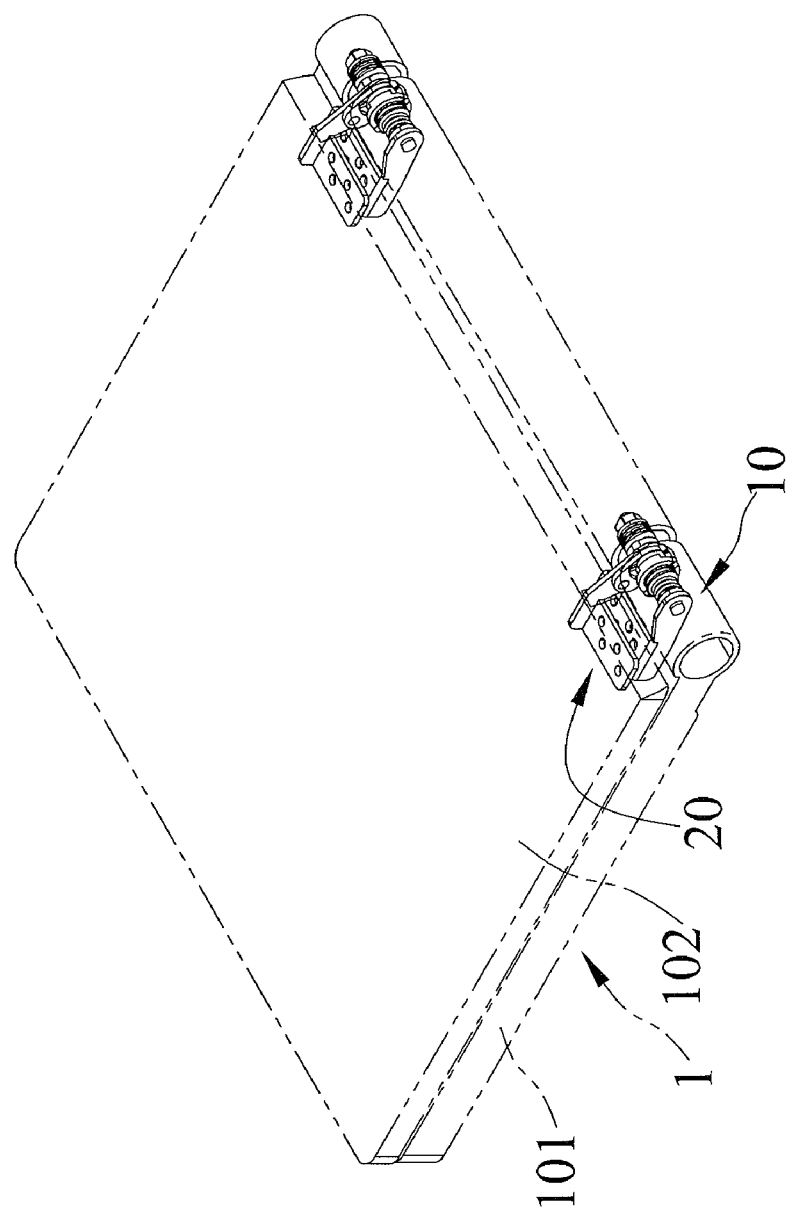
FIG. 22 shows the hinge utilized in an electronic device.
Figure 23:
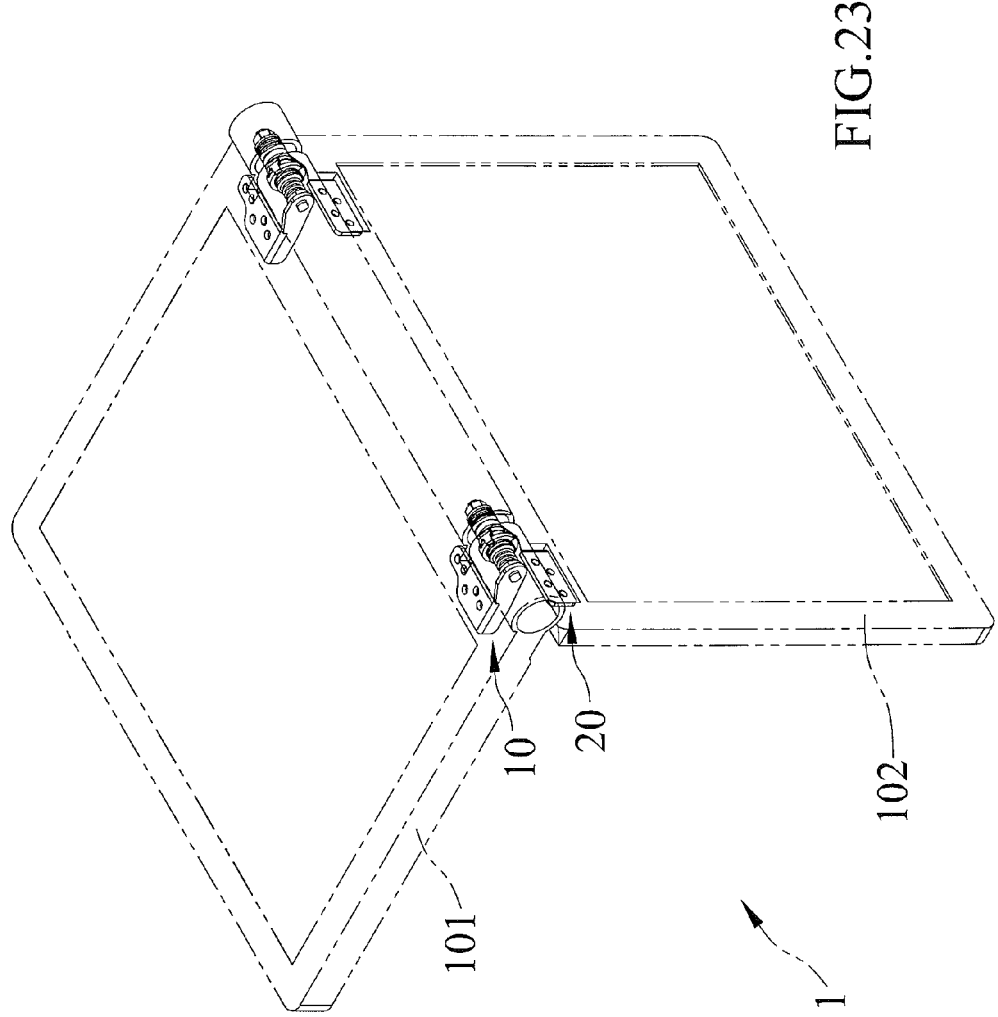
FIG. 23 shows the hinge in the fixed open position and the electronic device including first and second bodies fixed with respect to each other.

Furthermore, the extension 412 disengages from the first position-limiting passage 232, and the first cam 42 and the first cam follower 43 are in the second relative position, and the position limit 233 disengages from the locking slot 422, when the hinge is in a first position and is closed. FIG. 22 shows the hinge is closed and the electronic device is closed.

Figure 24:
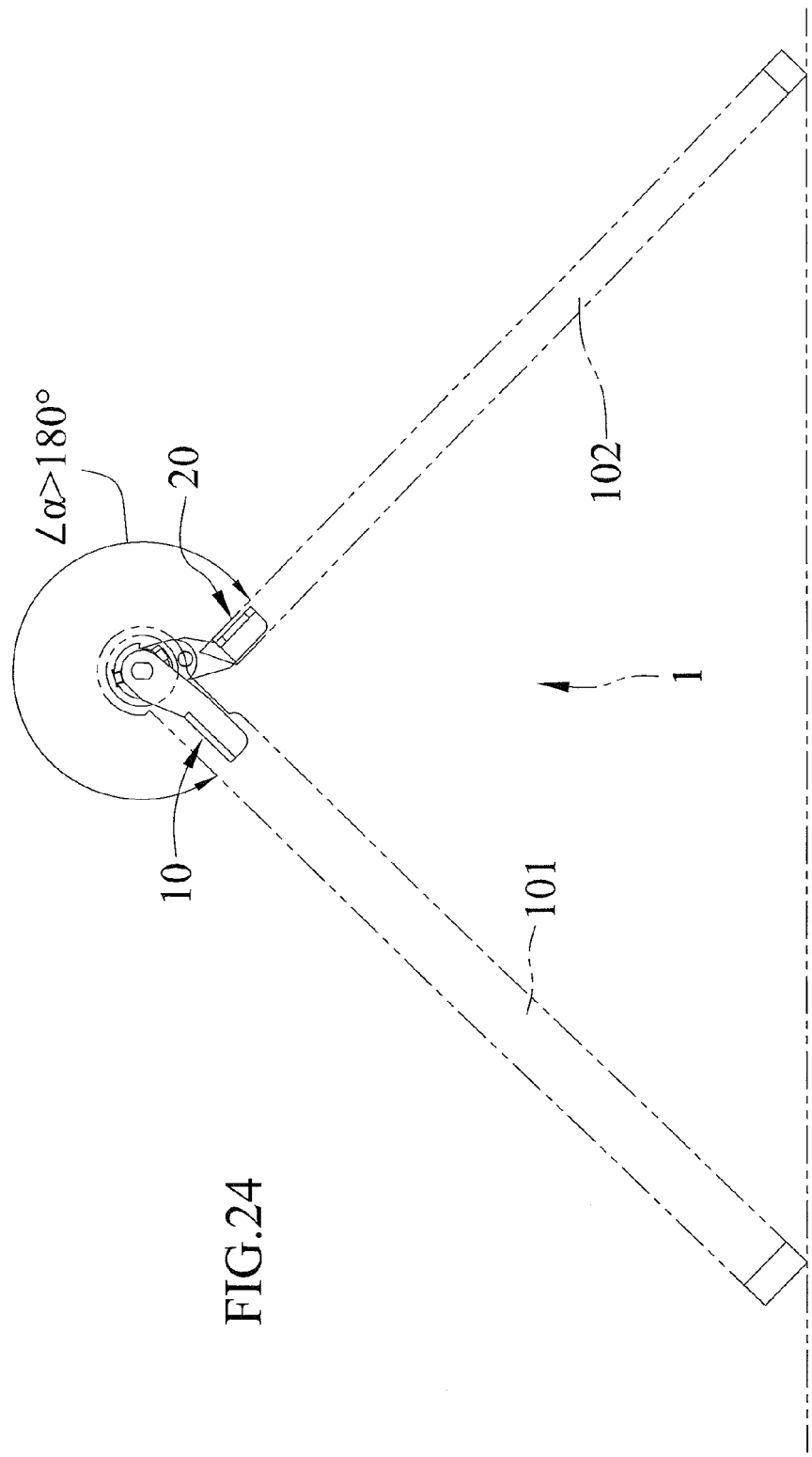
FIG. 24 is a side view of FIG. 23 showing the first and second bodies fixedly stand on a surface.

Moreover, the hinge is operable to open to a second position from the first position. The hinge is in the fixed open position when it is in the second position. The urging member 41 is pivoted by the second fixing member 20 and the first cam 42 is pivoted by the urging member 41 during the operation of moving the hinge from the first to second positions, with the first position-limiting passage 232 including a distal end abutting against the extension 412, with the extension 412 urging a terminal end of the second position-limiting passage 423. The extension 412 is disposed in the first position-limiting passage 232, and the first cam 42 and the first cam follower 43 are in the first relative position, and the position limit 233 is received in the locking slot 422, and the second fixing member 20 is rotated with respect to the first fixing assembly 10 through an angle "a" which is greater than 180°, when the hinge is rotated from the first to second positions. Preferably, the angle "a" is 270°. When the hinge is in the second position, the first and second fixing members 12 and 20 include an included angel which is equal to the angle "a". FIG. 24 shows the electronic device is open and the first and second bodies 101 and 102 are fixedly disposed relative to each other. When the hinge is in the second position, the second surface 4242 of each protrusion 424 and a corresponding wall of one of the recesses 432 that complementarily receives the protrusion 424 abuts against each other to prevent the hinge from being pivoted from the second to first positions.

Moreover, the hinge is operable to open to a third position from the second position. The extension 412 disengages from the first position-limiting passage 232, and the first cam 42 and the first cam follower 43 are in the second relative position, when the hinge is in the third position. The hinge is operable to close rapidly from the third to the first positions, with the urging member 41 adapted to be urged by the position limit 233 during the operation of moving the hinge from third to the first positions.

Further, a restrainer 13 is mounted on the pintle 11. The second fixing member 20, the first and second biasing devices 31 and 60, two washers 32, and the first and second position assemblies 40 and 50 are restrainedly disposed on the pintle 11 between the sixth section 115 of the pintle 11 and the restrainer 13.

While the specific embodiment have been illustrated and described, numerous modifications come to mind without significantly departing from the spirit of invention, and the scope of invention is only limited by the scope of the accompanying claims.

What is claimed is:

1. A hinge operable to a fixed open position where it is prevented from being closed and to a position where it is released from the fixed open position and is capable of being operated to a closed position, comprising:
    a first fixing assembly including a pintle and a first fixing member fixedly joined to the pintle, and wherein the electronic device includes first and second bodies pivotally connected to each other and one of the first and second bodies fixedly connected to the first fixing member;
    a second fixing member pivotally joined to the pintle and including a first position-limiting passage and a position limit defined thereon, and wherein the other of the first and second bodies is fixedly connected to the second fixing member;
    a first biasing device disposed on the pintle;
    a first positioning assembly including an urging member, a first cam, and a first cam follower disposed on the pintle and limited between the first biasing device and one side of a wall of the second fixing member, with the urging member including an extension extending over the first cam and selectively disposed in the first position-limiting passage, with the first cam including a locking slot selectively receiving the position limit and a second position-limiting passage receiving a length of the extension, with the first cam follower fixedly joined to the pintle, with the first cam and first cam follower in a first relative position where protrusions on a surface of the first cam are complementarily received in recesses on a surface of the first cam follower and the surfaces abut against each other, and in a second relative position where the protrusions are not received in the recesses and the surfaces are spaced from each other, with the extension disposed in and disengaged from the first position-limiting passage when the first cam and the first cam follower are in the first and second positions respectively, with the position limit disposed in and disengaged from the locking slot when the first cam and the first cam follower are in the first and second positions respectively;
    a second positioning assembly including a second cam member and a second cam follower disposed on the pintle, with the second cam member and the second fixing member articulated and pivoted together, with the second cam follower fixedly joined to the pintle, with the second cam and second cam follower in a first relative position where protrusions on a surface of the second cam are complementarily received in recesses on a surface of the second cam follower and the surfaces abut against each other, and in a second relative position where the protrusions are not received in the recesses and the surfaces are spaced from each other; and a second biasing device, and wherein the second positioning assembly is limited between the second biasing device and another side of the wall of the second fixing member;

wherein the extension disengages from the first position-limiting passage, and the first cam and the first cam follower are in the second relative position, and the position limit disengages from the locking slot, when the hinge is in a first position and is closed; and wherein the hinge is operable to open to a second position from the first position, and wherein the hinge is in the fixed open position when it is in the second position, and wherein the urging member is pivoted by the second fixing member and the first cam is pivoted by the urging member during the operation of moving the hinge from the first to second positions, with the first position-limiting passage includes a distal end abutting against the extension, with the extension urges a terminal end of the second position-limiting passage, and wherein the extension is disposed in the first position-limiting passage, and the first cam and the first cam follower in the first relative position, and the position limit is received in the locking slot, when the hinge is in the second position; and wherein the hinge is operable to open to a third position from the second position, and wherein the extension disengages from the first position-limiting passage, and the first cam and the first cam follower are in the second relative position, when the hinge is in the third position, and wherein the hinge is operable to close rapidly from the third to the first positions, with the urging member adapted to be urged by the position limit during the operation of moving the hinge from third to the first positions.

2. The hinge as claimed in claim 1, wherein the second fixing member includes first and second joining member pivotally receiving the pintle to enable the second fixing member pivotally joined to the pintle, said first joining member having an engaging end, with the second joining member fixed to a first of two opposing sides of a wall of the first joining member.

3. The hinge as claimed in claim 2, wherein the second fixing member includes a linking member defined on and extending out from a second of the two opposing sides of the first joining member, and wherein the second cam member includes an articulating end engaging with the linking member to join to the second fixing member.

4. The hinge as claimed in claim 1, wherein first position-limiting passage is in the form of a slot.

5. The hinge as claimed in claim 2, wherein the position limit is defined on the second joining member.

6. The hinge as claimed in claim 2, wherein the second joining member is not in structural contact with the engaging end.

7. The hinge as claimed in claim 1, wherein the first biasing device includes a spring which includes a plurality of loops.

8. The hinge as claimed in claim 1, wherein each of the protrusions includes a first surface extending obliquely and defined on one of two distal ends, and a second surface defined on the other of the two distal ends, and with the second surface of each protrusion and a corresponding wall of one of the recesses that complementarily receives the protrusion abutting against each other to prevent the hinge from being pivoted from the second to first positions.

9. The hinge as claimed in claim 8, wherein the second surface extends upright from the surface of the first cam.

10. The hinge as claimed in claim 1, wherein the second fixing member is rotated with respect to the first fixing assembly through an angle "a" which is greater than 180° when the hinge is rotated from the first to the second positions, with the first and second fixing members include an included angle which is equal to the angle "a".

* * * * *